(12) United States Patent
Johansen et al.

(10) Patent No.: US 12,135,013 B2
(45) Date of Patent: Nov. 5, 2024

(54) DE-RATING WIND TURBINE TOWER LATERAL OSCILLATION CONTROL

(71) Applicant: VESTAS WIND SYSTEMS A/S, Aarhus N (DK)

(72) Inventors: Nicolaj Winther Johansen, Hinnerup (DK); Poul Brandt Christensen, Ry (DK); Brian Ank Mertz, Aarhus C (DK); John Schwensen, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 45 days.

(21) Appl. No.: 18/004,957

(22) PCT Filed: Jul. 1, 2021

(86) PCT No.: PCT/DK2021/050220
§ 371 (c)(1),
(2) Date: Jan. 10, 2023

(87) PCT Pub. No.: WO2022/008016
PCT Pub. Date: Jan. 13, 2022

(65) Prior Publication Data
US 2023/0235725 A1 Jul. 27, 2023

(30) Foreign Application Priority Data

Jul. 10, 2020 (DK) .......................... PA 2020 70476

(51) Int. Cl.
*F03D 7/02* (2006.01)
(52) U.S. Cl.
CPC ......... *F03D 7/0224* (2013.01); *F03D 7/0264* (2013.01); *F03D 7/0296* (2013.01);
(Continued)

(58) Field of Classification Search
CPC . F03D 7/0224; F03D 7/0264; F05D 2270/334
See application file for complete search history.

(56) References Cited

U.S. PATENT DOCUMENTS 10,907,617 B2 * 2/2021 Caponetti ............... F03D 7/047
11,293,401 B2 * 4/2022 Caponetti ............... F03D 7/043
(Continued)

FOREIGN PATENT DOCUMENTS

EP 2486272 A2 8/2012
EP 2746575 A2 6/2014
(Continued)

OTHER PUBLICATIONS

International Search Report and Written Opinion for PCT Application No. PCT/DK2021/050220, dated Oct. 8, 2021.
(Continued)

*Primary Examiner* — Eldon T Brockman
(74) *Attorney, Agent, or Firm* — Patterson + Sheridan, LLP

(57) ABSTRACT

The invention provides a method of controlling operation of a wind turbine having a tower. The method includes determining an overall control output including lateral oscillation control for dampening lateral oscillation of the tower, and using the overall control output to control wind turbine operation. The method further includes receiving lateral oscillation sensor data indicative of a level of lateral oscillation of the tower, determining a rated lateral oscillation control output in dependence on the received lateral oscillation data, and receiving an indication of yaw error of the wind turbine. A lateral oscillation control output included in the overall control output is determined to be de-rated from the rated lateral oscillation control output when the indicated yaw error is above a predetermined lower threshold level.

20 Claims, 5 Drawing Sheets

(52) U.S. Cl.
CPC ... *F05B 2270/328* (2013.01); *F05B 2270/329* (2013.01); *F05B 2270/334* (2013.01)

(56) References Cited

U.S. PATENT DOCUMENTS

| | | | |
|---|---|---|---|
| 11,732,692 B2* | 8/2023 | Egedal | F03D 7/0232 |
| | | | 290/44 |
| 11,754,045 B2* | 9/2023 | Skaare | F03D 7/0224 |
| | | | 416/1 |
| 2016/0356266 A1 | 12/2016 | Koerber et al. | |
| 2019/0219033 A1* | 7/2019 | Caponetti | F03D 7/0204 |
| 2021/0156357 A1* | 5/2021 | Caponetti | F03D 7/043 |

FOREIGN PATENT DOCUMENTS

| | | |
|---|---|---|
| WO | 2015074664 A1 | 5/2015 |
| WO | 2018171852 A1 | 9/2018 |
| WO | 2019114908 A1 | 6/2019 |
| WO | 2019219137 A1 | 11/2019 |
| WO | 2020125901 A1 | 6/2020 |

OTHER PUBLICATIONS

Danish Patent Office, Search Opinion for Denmark Patent Application No. PA 2020 70476, dated Jan. 7, 2021.
Danish Patent Office, Search Report for Denmark Patent Application No. PA 2020 70476, dated Jan. 6, 2021.

* cited by examiner

DE-RATING WIND TURBINE TOWER LATERAL OSCILLATION CONTROL

FIELD OF THE INVENTION

The invention relates to controlling operation of a wind turbine having a tower and, in particular, to de-rating lateral tower oscillation control from a rated value when a yaw error of the wind turbine is above a predetermined lower threshold level.

BACKGROUND

Wind turbine control technology is used for optimisation of power and minimisation of loads. Many different loads act on a wind turbine, such as aerodynamic, gravity, centrifugal and inertial loads. Changes in the loads experienced by a wind turbine may be caused by wind conditions in the vicinity of the wind turbine, e.g. wind shear or turbulence, or may be caused by changing operation of the wind turbine, e.g. grid loss.

Wind turbine control approaches use a combination of collective and cyclic control, for instance controlling collective and individual pitch of a number of blades of a wind turbine, or controlling torque or power output of a generator of the wind turbine. Cyclic or individual pitch is used to control a number of factors, such as lateral (side-side) tower damping, asymmetric rotor load control, and tower torsional dampening.

As more advanced control approaches are implemented to control an ever-greater number of factors, there is a risk that some of the control approaches or features may in fact counteract one other. That is, implementation of one control approach directed to one control objective may degrade the performance or effectiveness of another control approach directed to another control objective that is being implemented at the same time.

It is against this background to which the present invention is set.

SUMMARY OF THE INVENTION

The inventor of the present invention has realised that different individual or cyclic pitch control approaches or algorithms can have a detrimental effect on the effectiveness of one another's performance. In particular, instead of reducing structural loading, control actions such as cyclic pitch control may in fact have the opposite effect. Clearly, this is undesirable and could negatively impact on the lifespan of certain structural components of a wind turbine. It has therefore been understood that there is a need to ensure that particular control actions can continue to address the particular factors that they are aimed at addressing without having a negative effect on other factors that also need to be addressed.

According to an aspect of the present invention there is provided a method of controlling operation of a wind turbine having a tower. The method comprises determining an overall control output according to a wind turbine control strategy and based on monitored operation of the wind turbine. The overall control output includes lateral oscillation control for dampening, or countering, lateral oscillation of the tower. The method comprises using the determined overall control output to control operation of the wind turbine. The method further comprises receiving lateral oscillation sensor data indicative of a level of lateral (side-to-side) oscillation of the tower, determining a rated lateral oscillation control output in dependence on the received lateral oscillation data, and receiving an indication of a yaw error of the wind turbine. A lateral oscillation control output included in the overall control output is determined to be de-rated from the rated lateral oscillation control output when the indicated yaw error of the wind turbine is above a predetermined lower threshold level.

The control strategy can include any suitable or desired objectives for controlling operation of the wind turbine, such as optimising or limiting power output of the turbine. The monitored operation can include measured and/or estimated values of various operating parameters of, or associated with, the wind turbine, e.g. rotor speed, power output, loading on various wind turbine components, wind conditions, etc. Yaw error refers to a misalignment of a rotor plane of the wind turbine relative to a wind direction in the vicinity of the turbine, in particular a misalignment in a yaw direction (which constitutes rotation of a nacelle of the wind turbine about an axis defined by the wind turbine tower), but can also include misalignment in a tilt direction of the turbine. The rated lateral oscillation control output may be regarded as an optimal control output for dampening or countering the lateral oscillations, and de-rating from the rated value may be regarded as reducing the effectiveness of the control output in dampening or countering the lateral oscillations.

The lateral oscillation control output may be determined to be the rated lateral oscillation control output when the indicated yaw error of the wind turbine is below the predetermined lower threshold level.

The lateral oscillation control output may be de-rated monotonically for increasing indicated yaw error of the wind turbine above the predetermined lower threshold level.

The monotonic de-rating may be a linear de-rating from the rated lateral oscillation control output.

The lateral oscillation control output may be de-rated to substantially zero lateral oscillation control when the indicated yaw error of the wind turbine is above a predetermined upper threshold level greater than the predetermined lower threshold level.

In some embodiments, the method comprises determining a lateral oscillation activity level, based on the received indication of yaw error, indicative of a degree to which the rated lateral oscillation control output is to be de-rated, wherein the lateral oscillation control output is determined as a proportion of the rated lateral oscillation control output using the determined lateral oscillation activity level.

The lateral oscillation control output may be included in the overall control output by at least one of: gain scheduling the rated lateral oscillation control output; and, reducing an amplitude of the rated lateral oscillation control output.

The indication of yaw error of the wind turbine may include data indicative of wind conditions in the vicinity of the wind turbine.

The data indicative of wind conditions may include data indicative of a wind direction in the vicinity of the wind turbine relative to a rotor plane of the wind turbine. Optionally, this data is sensor data.

The data indicative of wind conditions may include data indicative of at least one of: positive wind shear; negative wind shear; and, wind veer.

The indication of yaw error of the wind turbine may include data indicative of an asymmetric loading experienced by one or more components of the wind turbine, optionally an asymmetric moment experienced by the one or more components, further optionally a yaw moment experienced by the one or more components.

The received indication of yaw error may include data received from external to the wind turbine and indicative of at least one of: operation of one or more further wind turbines adjacent to the wind turbine; and, meteorological conditions in the vicinity of the wind turbine.

The indication of yaw error of the wind turbine may include an indication of a level of rotor load control in the overall control output. Alternatively, such an indication of (implemented or required) rotor load control level can be separate from the indication of yaw error, but de-rating of the rated lateral oscillation control output can additionally or alternatively be based on the indication of rotor load control and, in particular, de-rating of the rated lateral oscillation control output may be performed/determined when it is indicated that a level of rotor load control is above a predetermined lower threshold level.

In some embodiments, the lateral oscillation control output comprises a pitch modulation value for each of a plurality of respective blades of the wind turbine, and wherein the overall control output comprises an individual pitch reference value, including the respective pitch modulation value, for each of the blades.

In some embodiments, the lateral oscillation control output comprises a generator power offset value, and wherein the overall control output comprises a generator power reference value, including the generator power offset value, for a generator of the wind turbine.

According to another aspect of the present invention there is provided a non-transitory, computer-readable storage medium storing instructions thereon that when executed by a processor causes the processor to perform the method described above.

According to another aspect of the present invention there is provided a controller for controlling operation of a wind turbine having a tower. The controller is configured to determine an overall control output according to a wind turbine control strategy and based on monitored operation of the wind turbine. The overall control output includes lateral oscillation control for dampening lateral oscillation of the tower. The controller is configured to use the determined overall control output to control operation of the wind turbine. The controller is further configured to receive lateral oscillation sensor data indicative of a level of lateral oscillation of the tower, determine a rated lateral oscillation control output in dependence on the received lateral oscillation data, and receive an indication of a yaw error of the wind turbine. A lateral oscillation control output included in the overall control output is less than the rated lateral oscillation control output when the indicated yaw error of the wind turbine is above a predetermined lower threshold level.

According to another aspect of the present invention there is provided a wind turbine comprising a controller as described above.

BRIEF DESCRIPTION OF THE DRAWINGS

One or more examples of the invention will now be described, by way of example only, with reference to the accompanying figures, in which.

DETAILED DESCRIPTION

Figure 1:
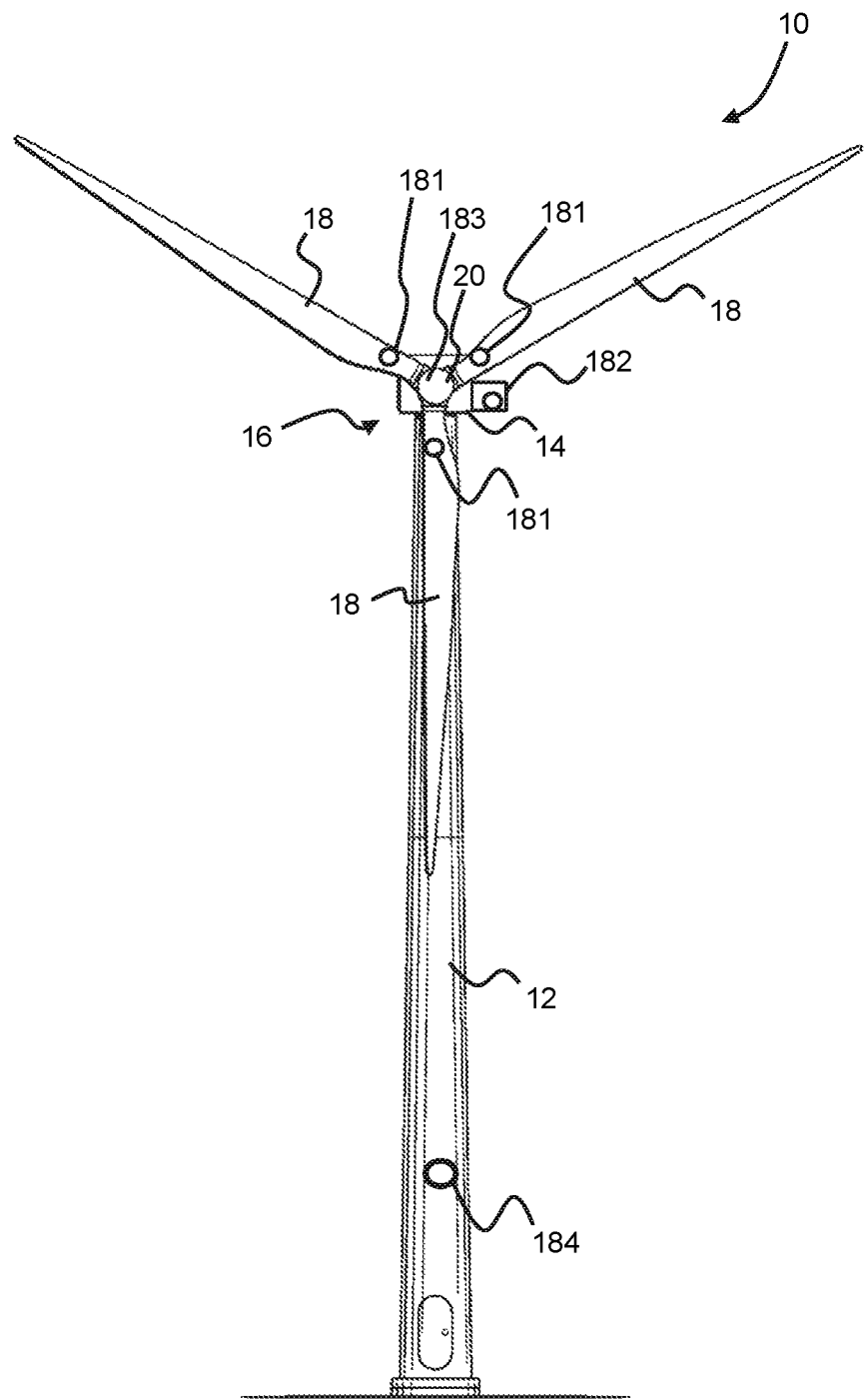
FIG. 1 is a schematic diagram of a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 and a single rotor 16, although other configurations including any suitable number of blades and rotors are possible.

The wind turbine 10 includes a number of different sensors for measuring various features of the operation of the turbine 10, and of the conditions in the vicinity of the turbine 10. Shown within each blade 18 is an optional blade load sensor 181 (in other examples there may be multiple blade load sensors allowing blade loads to be represented by more than a single variable). The sensing element may be a fibre optic strain gauge, a resistive strain gauge, or any other appropriate detector. A rotor wind speed and/or direction detector 182 is also shown—again, this measurement may be performed in several ways as the skilled person will appreciate, one being through a wind vane and an anemometer, and another through LIDAR, as the skilled person will appreciate from the literature of wind turbine design and control. A rotational speed sensor 183 is also shown—this may be, for example, in the form of a rotary encoder on a generator shaft of the turbine 10; however, the rotor speed may be determined in any suitable manner. An accelerometer 184 for measuring lateral, or side-to-side, oscillations or vibrations of the tower 12 is also included at a suitable location. Further sensors for measuring data indicative of misalignment of the turbine in one or both of the yaw and tilt directions, and/or for measuring asymmetric (tilt/yaw) loading moments of components of the wind turbine 10, may also be included.

Figure 2:
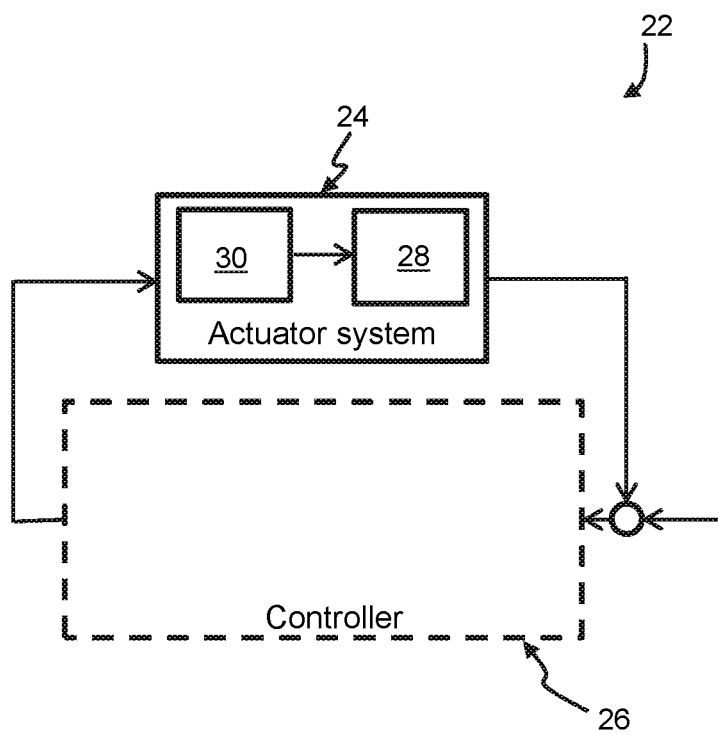
FIG. 2 shows a controller of the wind turbine of FIG. 1, and an actuator system of the wind turbine to be controlled by the controller.

FIG. 2 shows a wind turbine control system 22 in accordance with an example of the invention which may be implemented in the wind turbine 10 of FIG. 1. Here, the control system 22 includes an actuator system 24 that is controlled by a control unit or (overall) controller 26. In this particular example, the actuator system 24 may be, or may comprise, a pitch system for controlling pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28. The controller 26 and actuator system 24 may be replicated for each of the blades 18 of the wind turbine 10 so that the position of each blade 18 may be controlled independently.

The pitch system of the wind turbine 10 is just one example of a wind turbine system that may be controlled. The controller 26 may also be used to control other wind turbine systems and/or components. For instance, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion', i.e. changing the synchronous speed of the generator independently from the voltage and frequency of the grid.

In one example method of the invention, the pitch of individual blades 18 of the wind turbine 10 may be controlled according to a control strategy to maximise energy production and minimise loads based on the monitored operation of the wind turbine. In particular, the individual blade pitch may be controlled to alleviate fatigue loading on the turbine tower 12 caused by lateral (or side-to-side) oscillations of the tower 12. That is, the pitch is controlled to create a lateral or sideways force to counteract, and therefore dampen, the tower lateral oscillations. The individual blade pitch may also be controlled to reduce loading on one or more components of the turbine 10 caused by misalignment of a plane of the rotor 16 and blades 18 of the turbine 10 relative to wind direction in a tilt and/or yaw direction, or by excessive tilt and/or yaw moments.

Figure 3:
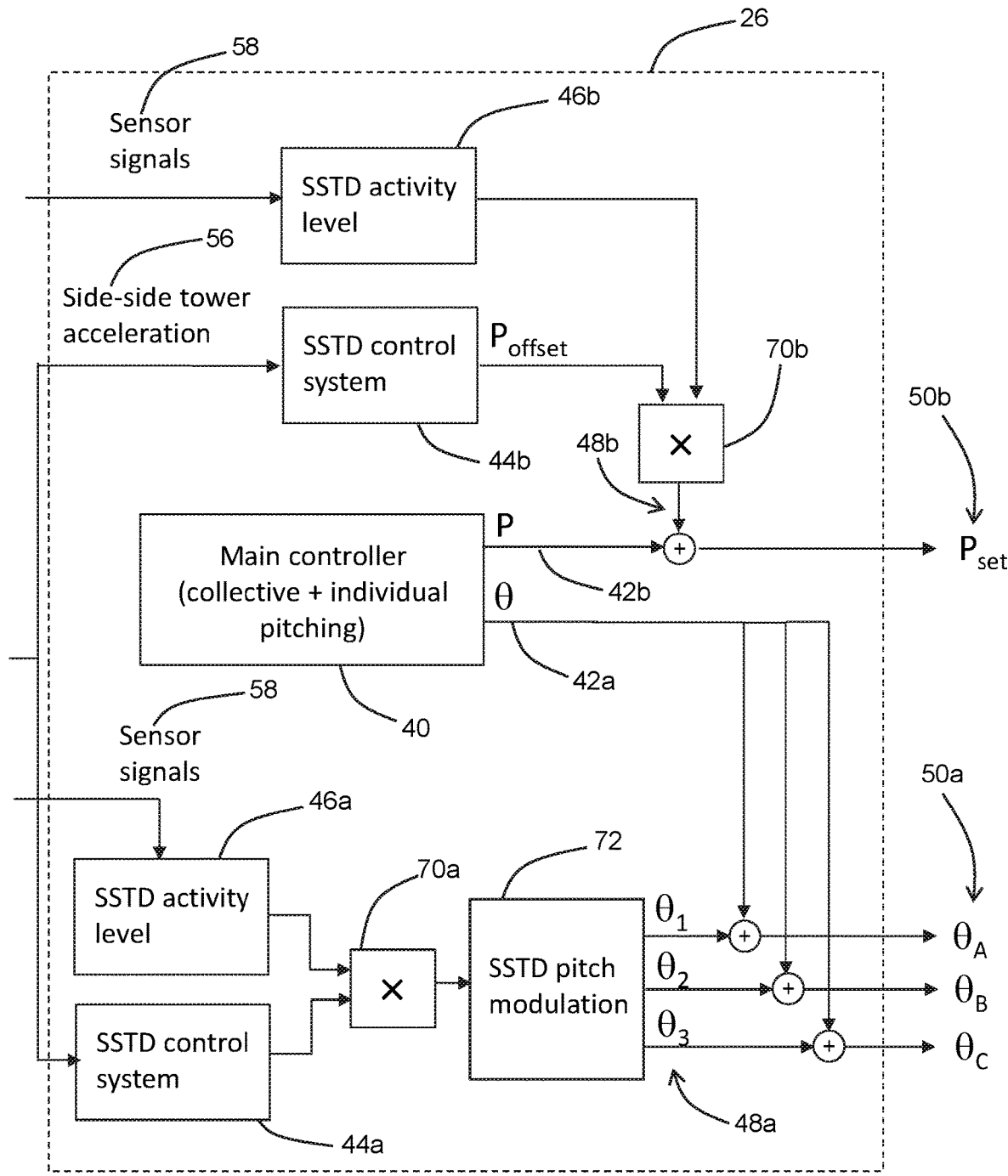
FIG. 3 shows component parts of the controller of FIG. 2, including a main controller for providing individual pitch and generator power control actions, and a tower lateral oscillation controller for adjusting the individual pitch and generator power control actions to provide overall control outputs.

A specific example implementing this approach in the controller or control system 26 is shown schematically in FIG. 3. Several functional elements are shown: a main controller 40 determines and generates control actions or outputs 42a, 42b according to a specified control strategy and based on a monitored—e.g. measured and/or estimated—operation of the wind turbine relative to the control strategy. The control actions 42a, 42b from the main controller 40 include actions to provide rotor load control for reducing asymmetric loading on the rotor 16 of the wind turbine 10. In particular, the control output 42a includes collective and individual pitching control, and the control output 42b controls wind turbine power output by, e.g. generator torque control.

Also included are functional elements for determining and generating control actions or modifications to provide lateral (side-to-side) oscillation control for dampening lateral oscillation of the tower 12. In particular, control elements 44a, 44b are provided to determine (rated) control actions for dampening lateral tower oscillation based on acquired signals indicative of side-to-side acceleration of the tower 12. Different elements 46a, 46b are provided to determine an activity level for the lateral tower oscillation control, based on various acquired information. The activity level is combined with the (rated) control actions from control elements 44a, 44b to provide lateral oscillation control outputs 48a, 48b to be combined with the control actions 42a, 42b from the main controller 40 to determine overall control outputs 50a, 50b to be used in controlling operation of the wind turbine 10. This is discussed in greater detail below.

The various functional elements or units of the controller 26 may be provided by suitable software running on any suitable computing substrate using conventional or customer processors and memory. These various functional elements may use a common computing substrate (for example, they may run on a single server) or separate substrates, or one or each may themselves be distributed between multiple computing devices.

In the example illustrated in FIG. 3, the overall control output 50a, 50b includes both: individual and collective pitch references 50a for each of the plurality of blades 18; and, a power set point or reference 50b for the wind turbine generator, e.g. torque or speed. However, it may be the case that only one of collective pitch or generator torque is controlled (by means of an appropriate actuator) in accordance with the appropriate reference point(s) at any given time. For instance, it is commonly the case that collective pitch may be controlled during rated operation of the wind turbine 10 ('full load'), whereas generator torque may be controlled during below-rated operation of the turbine 10 ('partial load'). Note that individual pitch is commonly controlled during both full and partial loading of the wind turbine 10. In the following, operation is mainly described in the case where the individual pitch SSTD control system 44a is active, but it will be understood that the power SSTD control system 44b may additionally, or alternatively, be used.

The main controller 40 generates a blade pitch control output 42a that includes both collective and individual pitch control outputs. As mentioned, the individual pitch control outputs 42a include rotor load control for reducing asymmetric loading experienced by the turbine 10. This is combined with individual pitch modulation 48a to generate overall individual pitch references 50a that also include tower lateral oscillation control.

The respective individual pitch control algorithms for rotor load control and tower lateral oscillation control can, in certain situations, degrade each other's performance when control outputs from each algorithm are both included in the overall individual pitch references. This can mean that asymmetric loading is not reduced and/or lateral tower oscillations are not dampened, as intended by the respective control algorithms.

It is noted that the degradation in performance of the load-reducing cyclic pitch algorithms is particularly apparent in conditions of large yaw error—i.e. significant misalignment between a rotor plane of the turbine 10 defined by the rotor 16 and blades 18, and wind direction, or excessive moments experienced by wind turbine components in the tilt and/or yaw direction. A large yaw error may mean that the asymmetric rotor load controller needs to be active to reduce asymmetric loads caused by the yaw error. However, in such a scenario it has been realised that operation of the SSTD controller to dampen lateral tower oscillations can degrade the performance of the asymmetric rotor load controller.

The present disclosure addresses this issue by recognising that in such conditions the SSTD controller can be de-rated to ease degradation in performance of the asymmetric rotor load controller, but without significant negative effects on its own objectives. In particular, it is recognised that in such conditions asymmetric rotor load control can be prioritised over tower lateral oscillation control because tower lateral oscillation control is used for reducing fatigue loads which are not so sensitive to (relatively rare) de-rating of its individual pitch contribution compared to those of rotor load control. That is, in conditions of significant tilt/yaw misalignment and/or moments performance of tower lateral oscillation control is de-rated from its determined rated or optimal performance.

The control element 44a—or side-to-side tower dampening (SSTD) control system 44a—receives data 56 indicative of lateral (side-to-side) oscillations experienced by the wind turbine tower 12. In the described example this data is in the form of sensor data received from the accelerometer measuring lateral acceleration of the tower 12.

Based on the received tower acceleration data, the control element 44a then determines a control output that is needed to dampen the lateral oscillations of the tower 12. In particular, this determination may be considered as an optimal control output in terms of effectiveness of dampening the lateral oscillations being experienced by the tower 12. That is, the control element 44a determines a control output for delivering rated performance of the tower lateral oscillation controller of the turbine 10.

The rated control output from the control element 44a is then to be combined with the output from the control element 46a. The control element 46a—or SSTD activity level unit 46—receives an indication of yaw error of the wind turbine 10. This indication can take different forms.

In the described example, the indication includes sensor data or signals 58 indicative of a level of tilt and/or yaw misalignment of the turbine 10. For instance, the sensor data 58 may be indicative of wind conditions in the vicinity of the wind turbine 10. Specifically, the sensor data 58 may indicate a level of yaw misalignment or error of the turbine 10, i.e. the error or difference between wind direction and the axis of the rotor 16. Alternatively, yaw misalignment can be determined based on wind direction relative to a plane of the turbine 10 defined by the swept area of the rotor 16 and blades 18 of the turbine, where ideal yaw alignment is when wind direction is perpendicular to the rotor plane. Tilt misalignment may be determined in an equivalent manner. In this case, the received data 58 may include measures of relative wind direction, and/or absolute wind direction with a yaw position of the nacelle 14.

The sensor data 58 may optionally include data indicative of extreme coherent wind gusts with direction changes, and/or of other extreme wind conditions that give rise to extreme rotor loads, such as extreme positive or negative wind shear, or wind veer. Sensor data indicative of such wind conditions may be acquired from one or more LIDAR sensors of the wind turbine 10, for instance.

The indication of yaw error of the wind turbine 10 may optionally include sensor data or signals indicative of an asymmetric (yaw) loading experienced by one or more components of the wind turbine 10. For instance, this could include a measured and/or estimated (significant) asymmetric moment experienced by one or more turbine components. In particular, these could be compensated for cyclic pitch control amplitudes that are being implemented by the controller 26. Alternatively, or in addition, this could include measured and/or estimated (significant) asymmetric moments combined with rotational frequency rotor load control amplitudes. Also, asymmetric loading data may include data indicative of extreme blade flap moments from the blade sensor 181.

Data indicative of wind conditions, and/or turbine component loading caused by wind conditions, may optionally be obtained from external to the wind turbine 10. For instance, data may be received by the controller 26—and, in particular, the control element 46a—that adjacent turbines in a wind park of the wind turbine 10 have experienced, or are experiencing any of the above-mentioned wind conditions or loading. Also, external data received by the controller 26 may include central server meteorology information indicative of wind conditions in the vicinity of the wind turbine 10.

It will be understood that any suitable combination of the above examples, or any other suitable data, may be used to provide the indication of yaw (and/or tilt) error of the wind turbine 10.

Based on the received indication of yaw error, the control element 46a determines an activity level for the tower lateral oscillation controller. The activity level is an indication of the level of tower lateral oscillation control that is to be utilised relative to its optimal or rated performance level. In general, the greater the level of yaw error of the wind turbine, the lower the determined activity level. This is to ensure that the tower lateral oscillation control does not degrade the performance of the rotor load controller, while still ensuring that the objectives of the tower lateral oscillation control, i.e. dampening lateral oscillations or vibrations of the tower 12, are being addressed.

Figure 4:
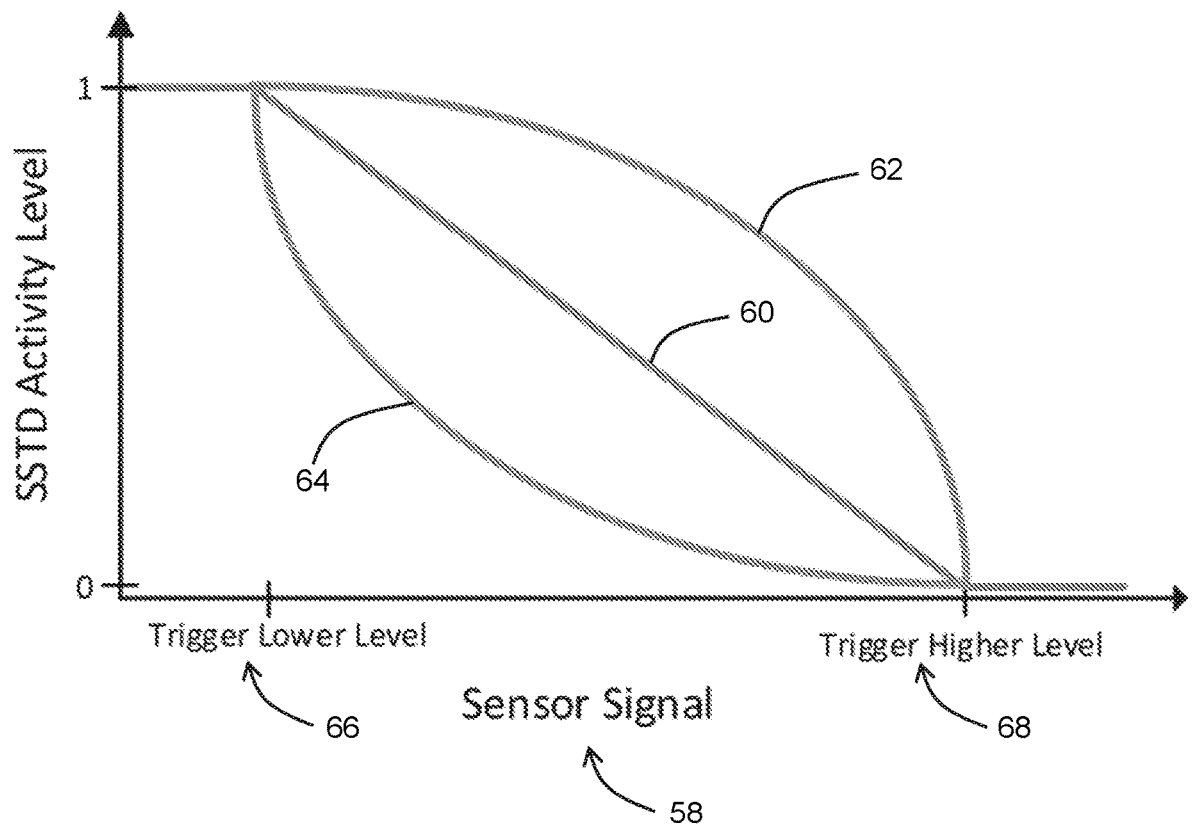
FIG. 4 illustrates examples of how performance of the tower lateral oscillation controller of FIG. 3 is de-rated in certain conditions; and, FIG. 5 summarises the method steps executed by the controller of FIG. 2 according to an example of the invention.

FIG. 4 shows an illustrative plot of how the determined activity level may vary according to the indication of yaw error which, in the described example, is provided by the sensor signals 58. The SSTD activity level of the described example may be regarded as a scaling factor for the rated lateral oscillation control output determined by the control element 44a. As such, the SSTD activity level can vary on a scale between zero and one.

Three illustrative examples 60, 62, 64 of how the activity level may vary with varying sensor signals 58 are shown. In the described example, an increasing magnitude of the sensor signals 58 is indicative of an increasing yaw misalignment or error; however, this can also mean increasing tilt misalignment or increasing asymmetric moments, for instance.

In each of the three examples 60, 62, 64, the activity level is equal to one for sensor signal levels below a trigger lower level 66. That is, in the described example, for yaw misalignment errors less than a lower threshold level the activity level is one such that, effectively, no scaling is applied to the rated lateral oscillation control output that is used to modulate the overall control output. Expressed differently, up to a certain level of yaw misalignment the tower lateral oscillation (SSTD) controller is fully operational. This ensures that SSTD operation is not shut off or de-rated in conditions where operation of the SSTD controller does not have a significant impact on operation of the rotor load controller. In a non-limiting example, the lower trigger level 66 may correspond to a rotor yaw misalignment of around 20 degrees; however, any suitable value may be used.

In each of the examples 60, 62, 64 the activity level decreases monotonically from one at the trigger lower level 66 to zero at a trigger higher level 68 of the sensor signals 58. In a first of the examples 60, the activity level decreases linearly from the trigger lower level 66 to the trigger higher level 68. In each of the other two examples 62, 64, the activity level decreases according to a quadratic curve, one 62 with downward curvature, and the other 64 with upward curvature.

In each of the three examples 60, 62, 64, the activity level is equal to zero for sensor signal levels above the trigger higher level 68. That is, in the described example, for yaw misalignment errors greater than an upper threshold level the activity level is zero such that no lateral oscillation control output is used to modulate the overall control output, i.e. tower lateral oscillation control is not present in the overall individual pitch control outputs 50a. That is, when rotor yaw misalignment, for instance, is particularly severe then the lateral oscillation controller does not contribute to controlling individual blade pitch.

The lower and upper trigger levels 66, 68 are tuning parameters that may be set in accordance with desired operation of the wind turbine 10. In some examples, only the lower trigger level may be present, and the activity level may asymptotically approach zero for increasing sensor signals 58.

The relationship between activity level and the sensor signals 58 may be continuous, and optionally smooth, to ensure predictable, consistent, and smooth operation of the tower lateral oscillation controller and of the wind turbine 10.

It will be understood that any suitable relationship between the SSTD activity level and data indicative of yaw error (in this case, sensor signals 58) may be defined or used.

Referring back to FIG. 3, the activity level scaling factor determined in the SSTD activity level module 46a is applied to the rated control output determined by the SSTD control system 44a in the processing element 70a, thus de-rating the rated control output (when the activity level is less than one). The controller 26 includes a lateral (side-to-side) pitch modulation element 72 that receives this de-rated control output and determines individual pitch modulation 48a to be included in the overall individual pitch control outputs 50a so as to include a certain amount of tower lateral oscillation dampening in the overall individual pitch references 50a used to control operation of the wind turbine 10. A lower activity level can mean that lower amplitude modulation—i.e. less tower lateral oscillation control—is included in the overall control outputs 50a. Alternatively, or in addition, the lower activity level can mean applying gain scheduling to the amplitude modulation of the rated control output.

It will be understood that the above-described functionality for the control elements used to determine individual pitch outputs for tower lateral oscillation control are applicable in an equivalent manner to the control elements 44b, 46b for determining an adjusted power offset, for providing tower lateral oscillation control, to determine the overall power set point used to control turbine generator operation.

Figure 5:
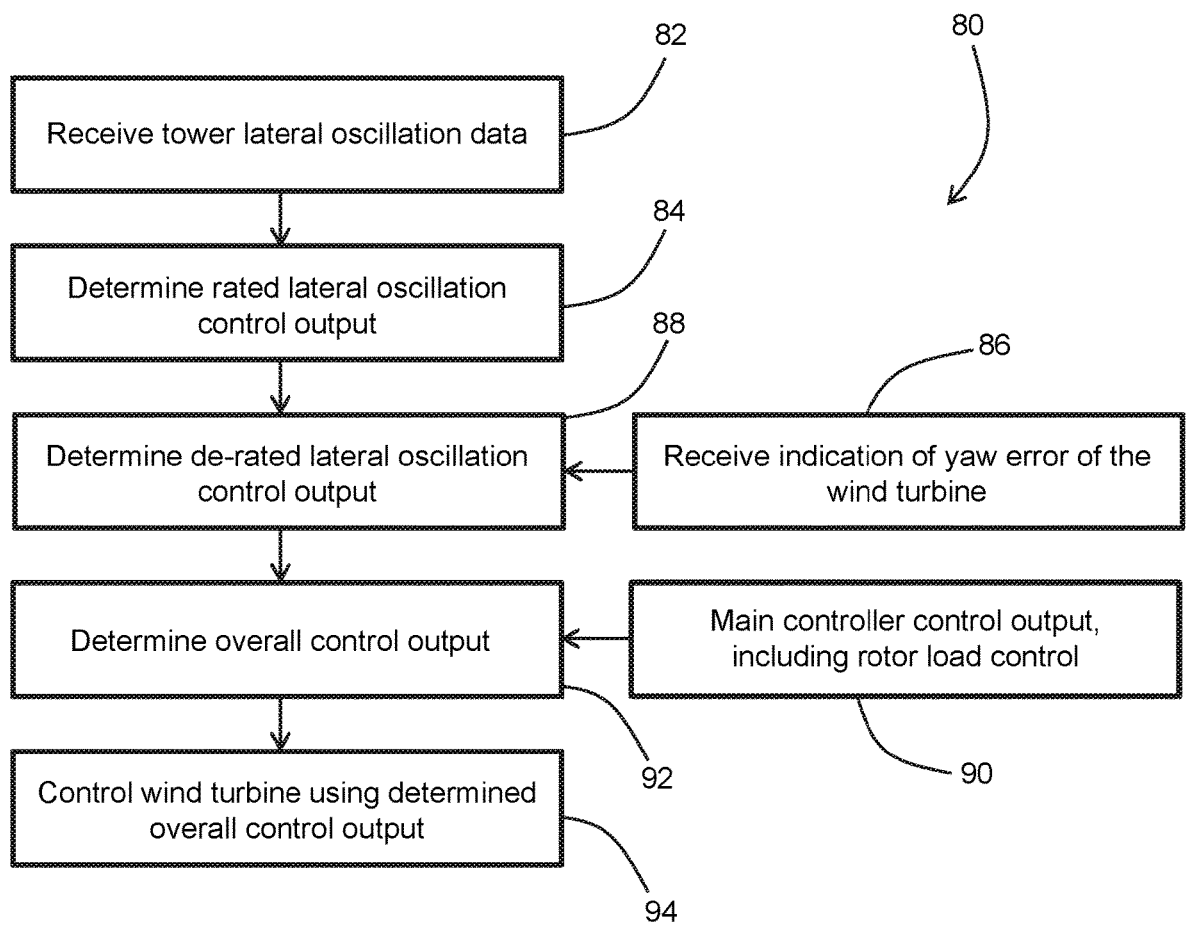

FIG. 5 summarises the steps of a method 80 performed by the controller 26 to determine and output the overall control outputs 50a for controlling operation, in particular individual pitch, of the wind turbine 10. At step 82, the controller 26—in particular, the SSTD control system 44a—receives data 56 indicative of the lateral or side-to-side oscillations being experienced by the tower 12. In the described example, this data is in the form of measured lateral acceleration from the accelerometer 184.

At step 84, the controller 26—in particular, the SSTD control system 44a—determines a rated lateral oscillation control output in dependence on the received lateral oscillation data 56. In the described example, this is in the form of individual blade pitch, but in different examples this can alternatively, or additionally, be in the form of generator torque (power) offset. This rated lateral oscillation control output would be in some sense an optimum determined control output for dampening the tower oscillations, for instance in the absence of other control considerations related to controlling rotor loads (cyclic loads).

At step 86, the controller 26—in particular, the SSTD activity level unit 46a—receives an indication of a yaw (and/or tilt) error of the wind turbine 10. That, is, the indication may be indicative of rotor/asymmetric loads that are, or may be, experienced by the wind turbine 10 such that a certain level of rotor load control is included in the control output by an asymmetric rotor load controller (which is included in the main controller 40 in the described example). The yaw (and/or tilt) error may be indicative of misalignment of the rotor 16 relative to wind direction in the yaw (and/or tilt) direction. The yaw error may additionally, or alternatively, be indicative of significant moments experienced by the wind turbine. In the described example, the indication of yaw error of the wind turbine 10 is in the form of sensor signals 58 indicative of measured yaw(/tilt) misalignment and/or moments. This can include measurements of wind conditions, such as wind direction, positive wind shear, negative wind shear, and/or wind veer. Estimated values of these variables/parameters may additionally, or alternatively, be used. The received indication of yaw error may additionally or alternatively include data received from external to the wind turbine 10. For instance, this can include information on the operation of one or more further wind turbines adjacent to the wind turbine 10 in a wind park, and/or meteorological conditions in the vicinity of the wind turbine 10 from a central server.

At step 88, the controller 26 determines a lateral oscillation control output 48a to be included in the overall control output 50a. In particular, the lateral oscillation control output 48a is determined to be de-rated from the rated lateral oscillation control output (determined in step 86) when the indicated yaw error 58 of the wind turbine 10 is greater than a prescribed threshold level. In the described example, this threshold level corresponds to the sensor signal trigger lower level 66. In the described example, the SSTD activity level unit 46a determines an activity level 60, 62, 64 based on the sensor signals 58, and this activity level is used to scale the rated lateral oscillation control output in the unit/module 70a. If the scaling is less than one, then the lateral oscillation control output to be used to control the turbine 10 is de-rated from the rated lateral oscillation control output. In the described example, the lateral oscillation control output is in the form of individual pitch modulation values 48a as determined in the SSTD pitch modulation unit 72 using the output from the scaling/de-rating unit 70a.

At step 90, the controller 26—in particular, the main controller 40—determines and outputs a control output 42a for controlling the wind turbine 10 according to a wind turbine control strategy and based on monitored operation of the wind turbine 10, in a known manner. This control output from the main controller 40 also includes asymmetric rotor load control for reducing asymmetric loading on the wind turbine 10.

At step 92, the control output 42a from the main controller 40 is combined with the individual and cyclic pitch modulation 48a to determine the overall control output 50a. For instance, the control output 42a may be amplitude modulated using the control output 48a to determine the overall control output 50a. That is, the overall control output 50a includes a de-rated level of tower lateral oscillation control in a case in which rated—or at least a greater level—of tower lateral oscillation control would negatively affect the effectiveness of the rotor load control also included in the overall control output 50a. At step 94, the wind turbine 10 is controlled using the determined overall control output 50a.

Many modifications may be made to the above-described example without departing from the scope of the appended claims.

In the above-described example, de-rating of the determined rated tower lateral oscillation control output is achieved by applying a scaling factor in the form of a determined activity level to the rated control output. However, it will be understood that in different examples de-rating may be achieved in any suitable manner, for instance by subtraction from the rated control output by an appropriate/determined amount. In some examples, the rated control output may not be determined (explicitly), and a de-rated control output may be determined directly.

In the above-described example, de-rating of the rated lateral oscillation control output is dependent on signals indicative of a yaw error of the wind turbine. The de-rating determination—e.g. the activity level determination—may also be dependent on additional factors. For instance, when the monitored tower lateral oscillations reach a predetermined level the controller may be configured to raise an alarm or alert to the large oscillations. De-rating of the tower lateral oscillation controller may therefore be made dependent on how close to this predetermined level of oscillation the tower is. For instance, the closer the tower is to the predetermined level the less the lateral tower level controller is de-rated, to ensure that the predetermined level is not exceeded, thus avoiding an alert being raised. As another example, the wind turbine may have certain thresholds of asymmetric loading moments (associated with one or more wind turbine components) that, if exceeded, cause an alert to be raised or even require shutdown of the turbine. De-rating of the tower lateral oscillation controller may therefore be made dependent on how close to these thresholds the measured and/or estimated asymmetric loading moments are. For instance, the closer to these threshold moments the measured and/or estimated values are, the more the tower lateral oscillation control may be de-rated to ensure that the tower lateral oscillation control does not degrade performance of the rotor loading controller trying to reduce these moments.

In the above-described example, de-rating of the rated lateral oscillation control output is dependent on signals indicative of a yaw error. In this example, the yaw error can be indicative that a certain level of asymmetric rotor load control is included in the overall control output; however, the yaw error need not necessarily be indicative of this. In different examples, de-rating of the rated lateral oscillation control output may additionally, or alternatively, be dependent on an indication of a level of asymmetric rotor load control that is implemented or required. In particular, lateral oscillation control included in the overall control output may be de-rated when the indication of the amount of asymmetric rotor load control required or included in the overall control output is above a threshold level. For instance the indication of the amount of rotor load control can be based on blade root load measurements or on a reading of a resulting gain factor that is used to scale a signal from the asymmetric rotor load controller superposed onto the individual pitch or power reference signal.

Examples of the present invention are advantageous in that they guard against different controllers aimed at reducing cyclic loads on a wind turbine from degrading one another's performance, while still not allowing fatigue loads to increase in a manner that will affect component lifespan. In particular, the invention is advantageous in the realisation that individual pitching (or generator torque control) to dampen lateral oscillations of the wind turbine tower can be de-rated (as a function of wind direction relative to the rotor plane or by measurement of yaw moment, for instance) in order that control to reduce other asymmetric loads on the rotor is not degraded in performance. This is because control to dampen tower lateral oscillations is not as sensitive to (relatively rare) de-rating of its individual pitch contribution (or generator torque offset) as other cyclic loading control. That is, priority can be given to reducing other asymmetric or cyclic loads as these other loads may cause greater/faster reduction in lifespan if not reduced compared with tower lateral oscillation loading. As described, the de-rating of tower lateral oscillation control can be achieved using one or more interpolations between one or multiple parameters to allow smooth de-rating of the periodic pitching.

The invention claimed is:

1. A method of controlling operation of a wind turbine having a tower, the method comprising:
   determining an overall control output according to a wind turbine control strategy and based on monitored operation of the wind turbine, the overall control output including rotor load control for reducing asymmetric loading on a rotor of the wind turbine and lateral oscillation control for dampening lateral oscillation of the tower;
   using the determined overall control output to control operation of the wind turbine;
   receiving lateral oscillation sensor data indicative of a level of lateral oscillation of the tower;
   determining a rated lateral oscillation control output in dependence on the received lateral oscillation sensor data; and
   receiving an indication of a yaw error of the wind turbine, wherein:
      the yaw error is a misalignment of a rotor plane of the wind turbine relative to a wind direction in a vicinity of the wind turbine; and
      a lateral oscillation control output included in the overall control output is determined to be de-rated from the rated lateral oscillation control output when the indicated yaw error of the wind turbine is above a predetermined lower threshold level in order to prioritize the rotor load control over the lateral oscillation control.

2. The method of claim 1, wherein the lateral oscillation control output is determined to be the rated lateral oscillation control output when the indicated yaw error of the wind turbine is below the predetermined lower threshold level.

3. The method of claim 1, wherein the lateral oscillation control output is de-rated monotonically for increasing indicated yaw error of the wind turbine above the predetermined lower threshold level.

4. The method of claim 3, wherein the monotonic de-rating is a linear de-rating from the rated lateral oscillation control output.

5. The method of claim 1, wherein the lateral oscillation control output is de-rated to substantially zero lateral oscillation control when the indicated yaw error of the wind turbine is above a predetermined upper threshold level greater than the predetermined lower threshold level.

6. The method of claim 1, comprising determining a lateral oscillation activity level, based on the received indication of the yaw error, indicative of a degree to which the rated lateral oscillation control output is to be de-rated, wherein the lateral oscillation control output is determined as a proportion of the rated lateral oscillation control output using the determined lateral oscillation activity level.

7. The method of claim 1, wherein the lateral oscillation control output is included in the overall control output by at least one of:
   gain scheduling the rated lateral oscillation control output; and,
   reducing an amplitude of the rated lateral oscillation control output.

8. The method of claim 1, wherein the indication of yaw error of the wind turbine includes data indicative of wind conditions in the vicinity of the wind turbine.

9. The method of claim 8, wherein the data indicative of wind conditions includes data indicative of a wind direction in the vicinity of the wind turbine relative to the rotor plane of the wind turbine.

10. The method of claim 8, wherein the data indicative of wind conditions includes data indicative of at least one of: positive wind shear; negative wind shear; and, wind veer.

11. The method of claim 1, wherein the indication of yaw error of the wind turbine includes data indicative of one or more of:
   an asymmetric loading experienced by one or more components of the wind turbine;

an asymmetric moment experienced by the one or more components; and a yaw moment experienced by the one or more components.

12. The method of claim 1, wherein the lateral oscillation control output comprises a pitch modulation value for each of a plurality of respective blades of the wind turbine, and wherein the overall control output comprises an individual pitch reference value, including the respective pitch modulation value, for each of the blades.

13. The method of claim 1, wherein the lateral oscillation control output comprises a generator power offset value, and wherein the overall control output comprises a generator power reference value, including the generator power offset value, for a generator of the wind turbine.

14. A controller for controlling operation of a wind turbine having a tower, wherein the controller is configured to:
determine an overall control output according to a wind turbine control strategy and based on monitored operation of the wind turbine, the overall control output including rotor load control for reducing asymmetric loading on a rotor of the wind turbine and lateral oscillation control for dampening lateral oscillation of the tower, and use the determined overall control output to control operation of the wind turbine;
receive lateral oscillation sensor data indicative of a level of lateral oscillation of the tower;
determine a rated lateral oscillation control output in dependence on the received lateral oscillation sensor data; and
receive an indication of yaw error of the wind turbine, wherein:
the yaw error is a misalignment of a rotor plane of the wind turbine relative to a wind direction in a vicinity of the wind turbine; and
a lateral oscillation control output included in the overall control output is determined to be de-rated from the rated lateral oscillation control output when the indicated yaw error of the wind turbine is above a predetermined lower threshold level in order to prioritize the rotor load control over the lateral oscillation control.

15. A wind turbine, comprising:
a tower;
a nacelle disposed on the tower; and
a controller, wherein the controller is configured to:
determine an overall control output according to a wind turbine control strategy and based on monitored operation of the wind turbine, the overall control output including rotor load control for reducing asymmetric loading on a rotor of the wind turbine and lateral oscillation control for dampening lateral oscillation of the tower;
use the determined overall control output to control operation of the wind turbine;
receive lateral oscillation sensor data indicative of a level of lateral oscillation of the tower;
determine a rated lateral oscillation control output in dependence on the received lateral oscillation sensor data; and
receive an indication of yaw error of the wind turbine, wherein:
the yaw error is a misalignment of a rotor plane of the wind turbine relative to a wind direction in a vicinity of the wind turbine; and
a lateral oscillation control output included in the overall control output is determined to be de-rated from the rated lateral oscillation control output when the indicated yaw error of the wind turbine is above a predetermined lower threshold level in order to prioritize the rotor load control over the lateral oscillation control.

16. The wind turbine according to claim 15, wherein the lateral oscillation control output is determined to be the rated lateral oscillation control output when the indicated yaw error of the wind turbine is below the predetermined lower threshold level.

17. The wind turbine according to claim 15, wherein the lateral oscillation control output is de-rated monotonically for increasing indicated yaw error of the wind turbine above the predetermined lower threshold level.

18. The wind turbine according to claim 17, wherein the monotonic de-rating is a linear de-rating from the rated lateral oscillation control output.

19. The wind turbine according to claim 15, wherein the lateral oscillation control output is de-rated to substantially zero lateral oscillation control when the indicated yaw error of the wind turbine is above a predetermined upper threshold level greater than the predetermined lower threshold level.

20. The wind turbine according to claim 15, wherein the controller is further configured to determine a lateral oscillation activity level, based on the received indication of yaw error, indicative of a degree to which the rated lateral oscillation control output is to be de-rated, wherein the lateral oscillation control output is determined as a proportion of the rated lateral oscillation control output using the determined lateral oscillation activity level.

* * * * *